(12) United States Patent
Garthwaite (10) Patent No.: US 7,565,497 B1
(45) Date of Patent: Jul. 21, 2009

(54) COARSE WRITE BARRIER CONTROL MECHANISM

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 440 days.

(21) Appl. No.: 11/138,253

(22) Filed: May 26, 2005

(51) Int. Cl.
*G06F 12/02* (2006.01)
(52) U.S. Cl. ..................... 711/158
(58) Field of Classification Search .......... 711/159
See application file for complete search history.

(56) References Cited

U.S. PATENT DOCUMENTS

| 7,039,664 B2 * | 5/2006 | Garthwaite ............. 707/206 |
| 2003/0033498 A1 * | 2/2003 | Borman et al. ........... 711/206 |
| 2004/0088277 A1 | 5/2004 | Garthwaite |
| 2004/0103126 A1 | 5/2004 | Garthwaite |
| 2004/0186863 A1 | 9/2004 | Garthwaite |

OTHER PUBLICATIONS

Richard Jones et al, "Algorithms for Automatic Dynamic Memory Management", *Garbage Collection*, 1996, pp. 183-226, Chapter 8, John Wiley & Sons, Ltd., Chichester, England.
Hezi Azatchi et al, "Integrating Generations with Advanced Reference Counting Garbage Collectors", Oct. 2002, Israel Institute of Technology.
David Detlefs et al, "Concurrent Remembered Set Refinement in Generational Garbage Collection", USINEX Java, Aug. 1-2, 2002, San Francisco, CA, USA.
Richard Hudson et al, "Sapphire: Copying GC Without Stopping the World", Java Grande 2001, 2000, Palo Alto, CA, USA.
Urs Holze, "A Fast Write Barrier for Generational Garbage Collectors", Computer Systems Laboratory, Stanford University.
David Detlefs et al, "Garbage-First Garbage Collection", Sun Microsystems, ISMM'04, Oct. 24-25, 2004, Vancouver, British Columbia, Canada.
Richard L. Hudson et al, "Incremental Collection of Mature Objects", University of Massachusetts, Amherst, MA, USA.
Jacob Seligmann et al, "Incremental Mature Garbage Collection Using the Train Algorithm", Computer Science Dept., Aarhus University, Denmark.

* cited by examiner

*Primary Examiner*—Hyung S Sough
*Assistant Examiner*—Hamdy S Ahmed
(74) *Attorney, Agent, or Firm*—Robert C. Kowert; Meyertons, Hood, Kivlin, Kowert & Goetzel, P.C.

(57) ABSTRACT

A method for a coarse write barrier control mechanism comprises maintaining a control table comprising a plurality of entries, where each entry may include an encoding of a write barrier function associated with a corresponding region of a heap. In response to a detection of a mutator write operation directed at the heap, the method includes selecting a particular entry of the control table that corresponds to a heap address specified in the write operation, and identifying a write barrier function from among a plurality of write barrier functions based on the encoding included in the selected entry.

22 Claims, 7 Drawing Sheets

COARSE WRITE BARRIER CONTROL MECHANISM

BACKGROUND OF THE INVENTION

1. Field of the Invention

The present invention is directed to computer systems. More particularly, it is directed to memory management of computer systems using what has come to be known as "garbage collection."

2. Description of the Related Art

In the field of computer systems, considerable effort has been expended on the task of allocating and managing memory. In general, memory may be allocated to data objects (which may also be referred to as data structures or records) either statically or dynamically. Some computer languages may require that memory be allocated for all the variables defined in a program statically, e.g., at compile time. Such static memory allocation may make it difficult to share available memory space among multiple applications, especially for applications that are long-lived. Abiding by space limitations may be easier when the platform provides support for dynamic memory allocation, e.g., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation. Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements may grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference."

A way of reducing the likelihood of such leaks and related errors is to provide memory-space reclamation in a more automatic manner. Techniques used by systems that reclaim memory space automatically are commonly referred to as garbage collection. Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable. As used herein, a call stack is a data structure corresponding to a process or thread (e.g., of an application), whereby the call stack comprises a sequence of frames that store state information, such as register contents and program counter values, associated with nested routines within the process or thread.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a root set, e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage collection mechanisms can be implemented by various parts and levels of a computing system. One approach is simply to provide them as part of a batch compiler's output. In this approach to garbage collection, in addition to generating code for the functionality supported by an application, the batch compiler may generate code that automatically reclaims unreachable memory space without explicit direction from a the programmer, and include it within the application's object code. Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage collection mechanism over a number of computer system layers.

Another approach to garbage collection may be taken in some systems that employ "virtual machines". In such a system, a compiler or an interpreter may convert source code for an application from a high-level language to instructions called "byte code" for virtual machines that various processors can be configured to emulate. One example of a high-level language for which compilers and interpreters are available to produce such virtual-machine instructions is the Java™ programming language. (Java is a trademark or registered trademark of Sun Microsystems, Inc., in the United States and other countries.) Typically, byte-code routines are executed by a processor under control of a virtual-machine process, and the virtual machine process provides memory management functions including garbage collection. For example, a memory management component of the virtual machine process may be responsible for allocating memory dynamically as needed and reclaiming unreachable memory when possible. Various other approaches to garbage collection may be employed, including implementation of garbage collection functions in hardware.

While an implementation of automatic garbage collection can greatly reduce the occurrence of memory leaks and other software deficiencies, it can also have significant adverse performance effects if it is not implemented carefully. To distinguish the part of the program that does "useful" work from that which does the garbage collection, the term mutator is sometimes used for the "useful" part; from the collector's point of view, what the mutator does is mutate active data structures' connectivity. The instructions executed by the garbage collector are typically considered memory management overhead, and a variety of garbage collection techniques (such as various types of incremental garbage collection, generational garbage collection, etc.) have been devised to reduce the collection overhead relative to the "useful" work done by the mutator.

Mutator operations may be interleaved with garbage collection operations in a variety of ways—for example, a garbage collector may be periodically or aperiodically activated to perform what is called a garbage collection "cycle", during which a portion or all of the heap (i.e., the dynamically allocated memory) for a mutator may be examined for unreachable objects, and any unreachable objects found may be reclaimed. After the cycle completes, the garbage collector may be deactivated until the next cycle is triggered, e.g., by a detection that insufficient heap memory remains free, or based on a schedule. The mutator may proceed with its operations concurrently with the garbage collection cycle in some implementations, while in other implementations mutator operations may be suspended during at least a part of the garbage collection cycle. Some garbage collectors (which may be termed incremental collectors) may be configured to collect only a subset of the heap at one time.

In distinguishing reachable objects from unreachable objects, garbage collectors often have to trace references between objects—for example, some garbage collectors have to identify those reference fields of an object that have been modified, as well as the objects that are referred to in the modified fields. In order to limit the amount of analysis required for collection, a record or trace of objects whose references have been modified by the mutator may be maintained. In some systems, a sequence of instructions to record such modifications, called a "write barrier", may be included or inserted into the mutator code for selected write operations of the mutator. Write barrier code may be added to a write operation in the mutator code to record information from which the garbage collector can determine where references were written or may have been written since an earlier collection cycle or collection interval. The information recorded by the write barrier or barriers may be provided to the garbage collector, and may be used by the collector (e.g., during a subsequent collection cycle or interval) to more efficiently identify objects that can be reclaimed. The types of operations performed within a write barrier may vary based on a variety of factors, such as the complexity of the collection algorithm, the data structure or structures used to store the reference tracing information, etc.

The insertion of write barrier code into a mutator code sequence increases the number of instructions executed by the mutator, and thus also tends to increase garbage-collection overhead. A number of different specialized optimization techniques have therefore been proposed to reduce barrier-related overhead. Some techniques check whether a written-to object is dirty and has already been identified as such, and may avoid introducing write barriers into mutator code for such objects. In other techniques, an incremental garbage collector may identify regions of memory that are being collected in a current collection interval or will be collected next, and may be able to skip certain write barrier actions (such as generating remembered set entries for some writes) for such regions. Multi-generational garbage collectors may employ different write barriers for different heap regions or generations, and some garbage collectors may require the application of a sequence of barrier actions for different phases of garbage collection. Multi-threaded collection techniques may also be employed, where, for example, a first set of threads may be configured to identify unreachable objects in a particular region of memory, while a second set of threads may concurrently examine and manipulate or refine memory reference information (e.g., remembered set information) pertaining to other regions that are currently not being collected. Some sophisticated garbage collectors may employ a combination of several of these techniques and/or other techniques that may also employ multiple write barrier actions. It may be difficult to efficiently and flexibly utilize multiple write barrier actions within a single garbage collector using existing techniques—for example, in cases where a collector has multiple phases, and the specific barrier action to use for a particular heap address varies in the different phases. If a complex decision process is used to select an appropriate write barrier action for each write, the processing overhead related to write barriers may become excessive. A more flexible and coarse-grained approach to support the selection of one of multiple possible write barrier actions to be performed for a given write operation (and for determining if any actions are needed at all) may help to simplify garbage collection implementations and further increase the overall efficiency of garbage collection operations.

SUMMARY

Various embodiments of a method and system for a coarse write barrier control mechanism are disclosed. According to a first embodiment, a method may comprise maintaining a control table comprising a plurality of entries, where each entry may include an encoding of a write barrier function associated with a corresponding region of a heap. In response to a detection of a mutator write operation directed at the heap, the method may include selecting a particular entry of the control table that corresponds to a heap address specified in the write operation, and identifying a write barrier function from among a plurality of write barrier functions based on the encoding included in the selected entry. Each control table entry may be associated with a relatively large region of the heap, e.g., a region that includes a plurality of independently allocated objects. Control table entries may be initialized with a default encoding representing a default write barrier, e.g., when memory for the heap is initially allocated or when an additional region is allocated for the heap. In some embodiments, the plurality of write barrier functions may include a null barrier, where for example no additional operations are executed beyond the instructions required to identify the write barrier.

In one embodiment, the method may further include, during a garbage collection cycle, determining whether an entry of the control table is to be modified in accordance with a collection policy in use during the collection cycle. If the result of the determination is positive, the entry may be modified accordingly. In embodiments where garbage collectors use multiple collection policies (e.g., different collection policies for different heap "generations"), the control table entries may be modified to include encodings indicating the respective write barrier functions for the collection policies. In one embodiment, the write barrier function for a write operation may be selected based on more than one control table entry. For example, contents of a first control table entry corresponding to an object modified in the write operation, as well as a second control table entry corresponding to a second value written in the write operation such as the address of the referred-to object, may be used to identify the write barrier function.

According to another embodiment, the method may include inserting one or more instructions corresponding to a selected write barrier into the object code of the mutator. The instructions may be inserted by a Just-In-Time (JIT) compiler in some embodiments. In one embodiment, two or more threads of a multi-threaded garbage collector may be configured to access and/or modify the control table concurrently. For example, a first thread may be configured to perform a first set of operations (e.g., find and reclaim unreachable objects) on a first region of the heap based on an encoding in a first control entry, while a second thread may be configured to at least partly concurrently perform a second set of operations (e.g., manipulate contents of supporting data structures such as remembered sets) for another region of the heap based on a second encoding in a second control entry.

In one embodiment, a system may include a garbage collector and an object code modifier. The garbage collector may be configured to maintain a control table including a plurality of entries, wherein each entry includes an encoding indicative of a write barrier function associated with a corresponding region of a heap. In response to a detection of a mutator write operation directed at the heap, the object code modifier may be configured to select a particular entry of the control table that corresponds to a heap address identified in the write operation, and to make a determination, based on the encoding included in the particular entry, whether a particular write barrier function from among a plurality of write barrier functions is to be performed for the write operation. If the result of the determination is positive, the object code modifier may be configured to insert one or more instructions corresponding to the particular write barrier function into the code sequence of the mutator.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
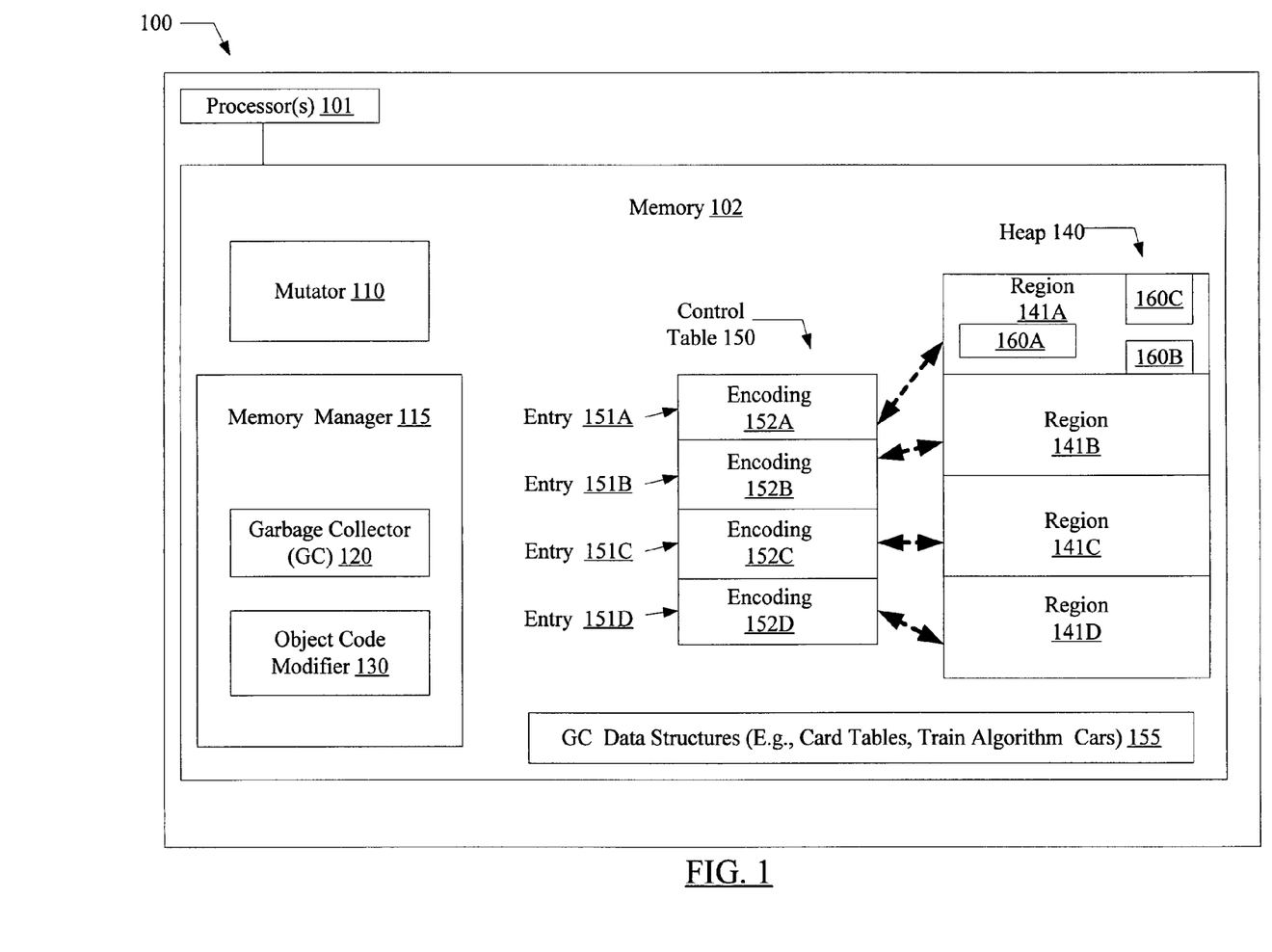
FIG. 1 is a block diagram illustrating one embodiment of a system.

FIG. 1 is a block diagram illustrating one embodiment of a system 100. The system includes one or more processors 101 and a memory 102. Memory 102 may include a memory manager 115, a mutator 110, and a heap 140 representing memory that is dynamically allocated to the mutator. Mutator 110 may represent any application process or thread that modifies dynamically allocated memory. An execution service (such as one or more compilers and/or interpreters, some of which may be incorporated within a virtual machine process in some embodiments) may be responsible for allowing the execution on processors 101 of the application code corresponding to the mutator. While only a single mutator 110 and its corresponding heap 140 is illustrated in FIG. 1, in general memory 102 may comprise numerous mutators 110, each of which may be associated with a corresponding heap 140. In addition, each mutator 110 may also access and modify statically allocated regions of memory (such as global variables) that are not shown in FIG. 1. Memory manager 115 may include several components or modules such as a garbage collector 120 to manage various aspects of memory management as described below in further detail. Actions taken in response to allocation of heap objects for the mutator, or in response to modification of heap objects by the mutator, may vary with the specific techniques employed for garbage collection in various embodiments. Such actions may be termed "write barriers" herein. The execution service may be configured to augment the allocation or write events with appropriate sets of instructions implementing the write barrier actions, for example through object code modifier 130 in some embodiments. For runtime services and for interpreters that may directly modify objects in heap 140, in some embodiments the effect of object code modifier 130 may be to provide functions to be called to perform the write barrier actions. In embodiments utilizing compiled code, object code modifier 130 (e.g., a compiler such as a Just In Time or JIT compiler) may generate object code for the write operations, and may additionally provide either a set of instructions to perform the barrier actions directly and/or a set of functions to be called by the generated object code corresponding to the write operations. In some embodiments, the internal organization of memory manager 115 may differ from that depicted in FIG. 1; for example, in one embodiment a separate memory allocator module of memory manager 115 may be configured to allocate memory for mutator 110 as needed, and in other embodiments object code modifier 130 may be external to memory manager 115.

Garbage collector 120 may be configured to implement any of a variety of collection policies to identify and reclaim objects or portions of each heap 140 that are no longer reachable from the mutator 110 associated with that heap. In addition, garbage collector 120 may be configured to maintain a control table 150 including a plurality of entries 151. Each entry 151 may be associated with a corresponding region 141 of heap 140, and may include an encoding 152 of a write barrier function associated with the corresponding region 141. For example, entry 151A may correspond to region 141A of heap 140 and may include encoding 152A, entry 151B may correspond to region 141B and include encoding 152B, and so on. Garbage collector 120 may be configured to modify the encodings 152 as needed to indicate the specific types of write barrier operations that are to be performed for mutator write operations that affect objects in the corresponding heap regions 141, depending for example on the specific collection policies in use at the garbage collector in a particular embodiment. The amount of heap memory that corresponds to a single control table may be configurable in some embodiments; e.g., a single control table entry 151 may correspond to a relatively large region 141 (e.g., 64 Kilobytes or 128 Kilobytes). Thus, for example, a single heap region 141 may include numerous objects that may have been allocated independently, such as objects 160A, 160B and 160C in region 141A of FIG. 1. Depending on its collection policy or policies, garbage collector 120 may also be configured to maintain one or more additional data structures 150 (such as "card tables" used in certain generational garbage collection techniques, "cars" and/or "remembered sets" used in various collection techniques employing variants of what is known as the "train algorithm"), for example to maintain state information between successive garbage collection cycles or phases.

In response to a detection of a write operation (such as a write operation that updates a reference field of an object 160) directed at heap 140 in the code sequence of mutator 110, a component of memory manager 115 such as object code modifier 130 may be configured to select a particular entry 151 of control table 150 that corresponds to an address identified in the write operation. In one implementation, for example, the particular entry 151 may be selected by performing a logical shift operation to obtain an appropriate number of high-order bits of an address, and using the high-order bits to index into the control table 150. In various implementations, the address on which the logical shift operation is performed may be, for example, the address of a reference slot or field of the updated object, the address of the updated object itself, or an address of a thread-local allocation buffer in which the updated object is located. Based on the encoding 152 within the selected entry 151, the component of memory manager 115 may be configured to identify a particular write barrier function, from among a plurality of write barrier functions, that is to be performed for the write operation. The particular write barrier function may then be implemented, e.g., by inserting a corresponding sequence of instructions (which may be an empty sequence in the case of a special write barrier function termed a "null barrier" as described below) into the mutator code. The control table may allow garbage collector 120 to dynamically control the selection of a specific write barrier function to be performed for writes affecting a particular region 141 in some embodiments. For example, an incremental garbage collector 120 that is configured to operate in a sequence of collection intervals may insert a first encoding 152A into entry 151A during a particular collection interval. The first value of encoding 152A may then govern the write barrier actions that are performed for mutator writes affecting region 141A until the next collection interval. During the next collection interval, the incremental garbage collector 120 may modify encoding 152A, so that a different set of write barrier actions may be performed for mutator writes affecting region 141A until the value of encoding 152A is again modified by the garbage collector.

Each encoding 152 may be relatively small (e.g., 8 or 16 bits) in some embodiments. A number of different techniques may be used to map an encoding 152 to the corresponding write barrier function as described below in further detail; e.g., in one implementation, an encoding 152 may represent an offset into a table of write barrier function instruction sequences. By using small encodings and/or keeping the total number of entries in control table 150 relatively small, garbage collector 120 may be able to flexibly implement a variety of different write barrier functions without an excessive use of memory, even for large heaps 140. For example, in an implementation where each entry 151 comprises a one byte encoding (e.g., 8 bits), and each heap region 141 includes 64 Kilobytes of memory, control table 150 may consume only $(1/65536)^{th}$ as much memory as heap 140: thus, in such an implementation, a heap of size 256 Megabytes may require only four Kilobytes to store control table 150.

In one embodiment, garbage collector 120 (or an allocator module of memory manager 115) may also be configured to allocate additional memory for heap 140 as needed by mutator 110, e.g., up to a maximum specified heap size. When an additional region 141 is allocated for the heap 140, garbage collector 120 may initialize a corresponding entry 151 in control table with an encoding 152 for a default barrier function in such embodiments. In some implementations, where for example the maximum allowed heap size is known in advance, memory sufficient to include control table entries 151 for the maximum allowed heap size may be allocated for control table 150 once and maintained for the lifetime of the mutator 110, while in other implementations, memory for control table entries 151 may be dynamically allocated as the heap grows.

By controlling the selection of write barrier functions at a relatively coarse granularity (e.g., at the level of relatively large heap regions 141 rather than on a per-object level), garbage collector 120 may also be able to reduce the total number of memory accesses associated with write barrier functions for a heap region 141. For example, in one implementation, once an encoding 152 has been loaded from memory 102 into a register at a processor 101 for a first object 160 or first object field of a region 141 that is affected by a write operation, that encoding may be re-accessed from the processor register for subsequent writes to other objects 160 or other object fields within region 141, without having to reaccess the control table 140 in memory 102. In some implementations, dynamic memory allocation may be managed in such a way that an object 160 does not cross region boundaries; that is, each object may be allocated entirely from within a single region 141. In such implementations, once a write barrier function has been identified for an update to a particular field of an object 160, the same write barrier function may be used for any updates to other fields of the same object without any further examination of control table 150 during periods of execution when the corresponding control table entry 151 is known not to be modified.

The values stored in encodings 152 may be selected by garbage collector 120 based on the specific garbage collection policies and associated write barrier techniques being used. In some embodiments, for example, a garbage collector 120 may use encodings 152 simply to differentiate one or more heap regions 141 for which notification information for a write is to be stored in a data structure 150 from other heap regions for which no notification information may be needed. In such an embodiment, the encodings 152 may include as few as two distinct values, a first value indicating that no additional write barrier operations are to be performed for the corresponding region 141, and a second value that indicates that some additional write barrier function is to be performed for the corresponding region. The term "null barrier" may be used herein to indicate a barrier function that does not require any additional instructions to be executed for a write operation. It is noted that the determination that a null barrier is the appropriate barrier function for a particular write operation may itself require the execution of one or more instructions, so even a null barrier may add to write barrier-related overhead; however, the use of control table 150 as described herein may allow such a determination to be made efficiently.

For example, as described below in conjunction with the description of FIG. 7, in some embodiments a negative numerical value of encoding 152 may identify a null barrier, while a non-negative value may be used to denote a different barrier such as a card table update. The determination as to whether a numerical value of encoding 152 is negative or not may often be made using as few as one or two instructions.

Such an efficient identification of the set of write operations that need no additional write barrier instructions to be executed may result in a significant reduction in overall garbage collection-related overhead for certain types of collection policies and mutators. For example, some garbage collectors (which may be termed "incremental" garbage collectors) may be configured to divide the task of finding and reclaiming unreachable objects in the heap 140 into a sequence of "collection intervals". Within each collection interval, an incremental garbage collector 120 may be configured to find and reclaim objects from only a portion of a heap 140, instead of examining the entire heap. It is noted that for garbage collectors that are periodically activated, the term "collection cycle" may be used herein to designate the set of operations performed during an activation period, which may or may not include garbage collection for the whole heap 140; and for incremental periodically activated garbage collectors, the set of operations performed during an activation period may also be termed a collection interval. The portion of the heap from which memory may be reclaimed during one collection interval may be termed a collection set. Many incremental garbage collectors operate in "generations", where different portions or generations of the heap 140 are subject to different collection policies. New objects may be allocated in a "young" generation, and older objects may be promoted from younger generations to older or more "mature" generations. Collecting the younger generations more frequently than the others may yield greater efficiency because younger generations tend to accumulate garbage (e.g., unreachable objects) faster. Depending on the specific collection policy in use, some garbage collectors may not need to be notified about certain writes within a young generation (which may, for example, be known to be scheduled for collection in a next collection cycle or interval). Null barriers may be used for such writes in some embodiments, e.g., by setting an encoding 152 for a null barrier in one or more control table entries 151 corresponding to the young generation. Since a large proportion of writes in mutator code are often directed at the young generation, using the control table to quickly identify that no further write barrier operations are needed for such writes may significantly reduce garbage collection overhead in such embodiments.

In some embodiments, a garbage collector 120 may employ more than one collection policy, each with its associated write barrier. For example, some generational garbage collectors may divide the heap into more than two generations, where the barrier function differs from one generation to another. In addition, even for certain collection algorithms such as variants of the train algorithm that may not divide the heap into multiple generations per se, the specific set of operations that may have to be performed on data structures 150 (such as remembered sets) during write barriers may differ from one heap region 141 to another, so different barrier functions (possibly including null barriers) may be needed for different heap regions 141. Other garbage collectors may employ a combination of techniques, such as reference counting in a first set of heap regions, and a generational collection technique using copying/relocating of objects in a second set of heap regions. Two or more different write barriers may be used in such collectors, such as barriers that may modify reference counts, one or more barriers implementing variants of the card table technique, as well as null barriers. In such embodiments, encodings 152 may be implemented as a set of distinct values, one value corresponding to each specific barrier function. Some sophisticated garbage collectors may perform collection in multiple phases, where during each collection phase, different heap regions 141 may require corresponding different barrier functions. For example, one example of such a multi-phase garbage collector may include a "mark" phase in which reachable objects are identified and enqueued for copying, a "copy" phase in which the reachable objects are copied into a newly-allocated region of the heap, and one or more "flip" phases in which pointers to the reachable objects from thread stacks are updated or flipped to point to the copied objects. A variety of write barriers may be used for different heap regions 141 during each phase of collection. In embodiments employing such multi-phase collectors, the specific write barrier function associated with a write may vary not only based on the address of an object affected by the write, but also based on the current phase of collection. The number of different values of encodings 152 that may be needed in such embodiments may therefore be relatively high, for example as high as the product of the number of phases and the average number of different barrier functions used within a phase.

Figure 2:
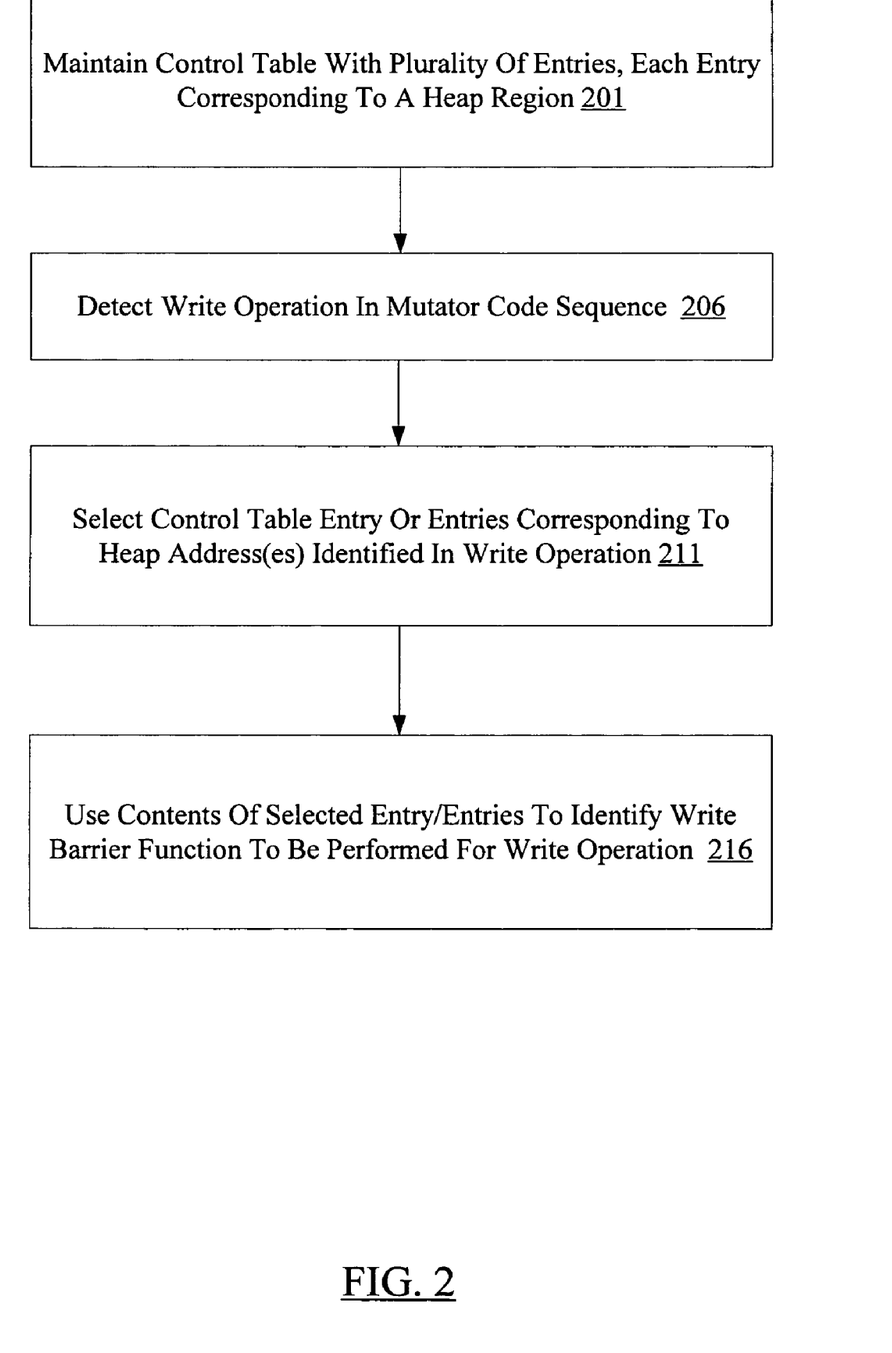
FIG. 2 is a flow diagram illustrating aspects of the operation of a system according to one embodiment.

FIG. 2 is a flow diagram illustrating aspects of the operation of system 100 according to one embodiment. As shown in block 201 of FIG. 2, garbage collector 120 may be configured to maintain control table 150 including a plurality of entries 151, each entry corresponding to a corresponding region 141 of heap 140 containing memory dynamically allocated for a mutator 110. Upon detecting a write operation in the code sequence of the mutator 110 (block 206), a component of memory manager 115 (e.g., an object code modifier 130) may be configured to identify one or more entries 151 corresponding to a heap address or addresses identified in the write operation (block 211). After the control table entry or entries 151 have been identified, the contents (e.g. encodings 152) of the entry or entries may be used to identify the specific write barrier function to be performed for the write (block 216 of FIG. 2). It is noted that only a subset of write operations may need to be considered for potential write barrier functions, in some embodiments; e.g., the object code modifier 130 may be configured to identify only those writes that store actual reference values of objects into object reference fields (rather than for example, storing degenerate values such as NULL), and perform the operations illustrated in blocks 211 and 216 for such reference-updating write operations. While in some embodiments only the address of an object that is being modified in the write operation may be used to select a corresponding control table entry 151, in other embodiments, more than one address (e.g., the addresses of the object being modified and the object being referenced) may be used to identify the control table entries to be used in selecting the write barrier function, as described below in further detail in conjunction with the description of FIG. 6.

Figure 3:
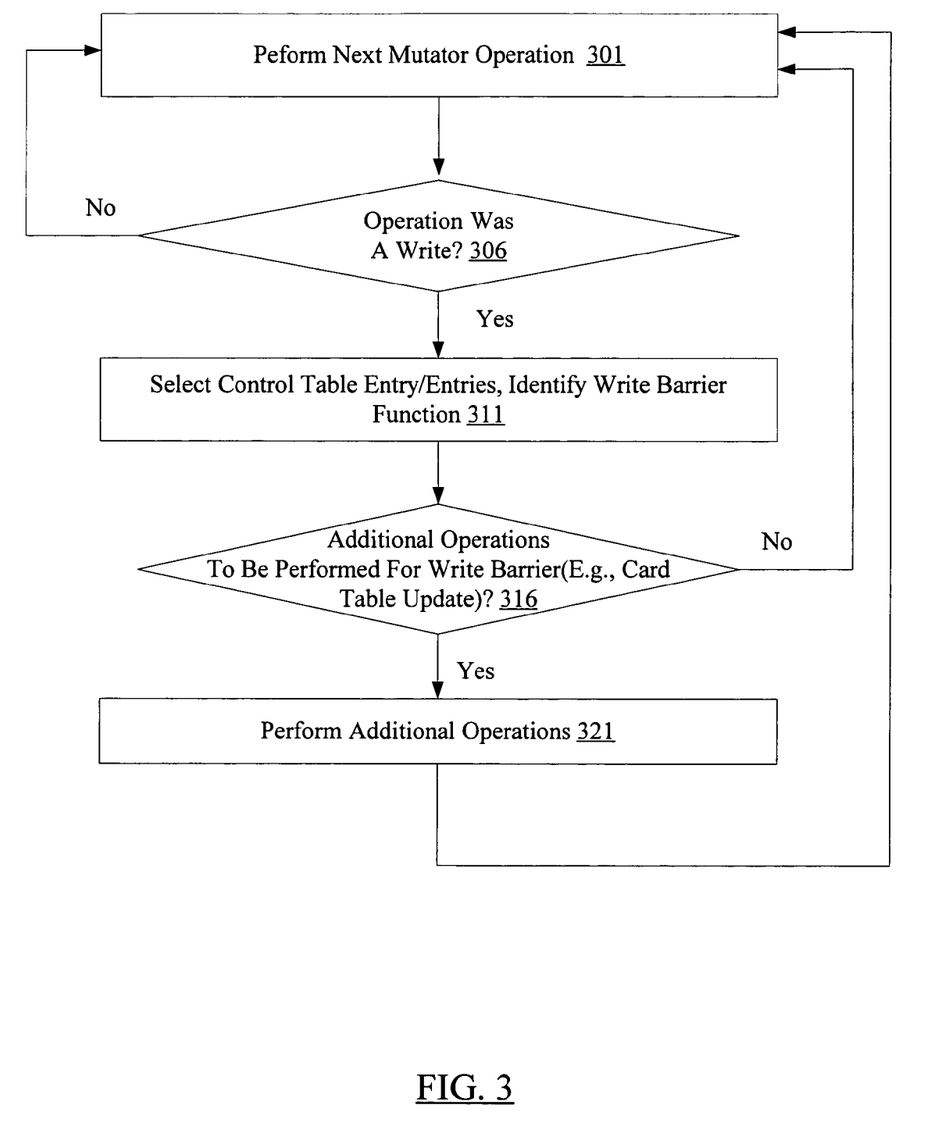
FIG. 3 is a flow diagram illustrating aspects of the operation of a mutator according to one embodiment.

FIG. 3 is a flow diagram illustrating further aspects of the operation of a mutator 110 according to one embodiment. Depending on the specific type of garbage collection technique being used, mutator 110 may be configured to operate either concurrently with garbage collector 120, or during periods when garbage collector 120 is not collecting (e.g., between collection intervals of an incremental garbage collector). In some embodiments, mutator 110 may perform its operations concurrently with most phases of garbage collection, but may be suspended during one or more specific phases of garbage collection. Regardless of whether garbage collection is being performed concurrently or not, when the mutator 110 performs its next operation (block 301 of FIG. 3), in embodiments where heap modifications are made by runtime services or an interpreter, object code modifier 130 (or another component of memory manager 115 or of a runtime environment supporting the execution of the mutator) may be configured to check whether the operation was a write operation (decision block 306). In some embodiments, as noted above, the object code modifier 130 may be configured to perform more specific checks on the nature of the mutator's write operation, such as whether the write was a reference-modifying write and/or whether the value stored during the write was an actual reference value; in other embodiments, a write barrier function (possibly a null barrier) may be identified for all write operations. If the operation was not a write, mutator 110 may be allowed to proceed to its next operation (e.g., return to block 301). If the object code modifier 130 makes a determination that the write requires a write barrier function, the object code modifier 130 may be configured to select one or more control table entries 151 identified in the write operation (block 311) and identify a write barrier corresponding to the selected control table entries. If the identified write barrier is not a null barrier, e.g., if additional operations have to be performed for the write operation (as detected in decision block 316), the additional operations may be performed (block 321). For example, in embodiments where heap modifications are made by runtime services or by an interpreter, the object code modifier 130 may provide functions to be called to perform the write barrier actions. In embodiments where object code modifier 130 is a JIT compiler, the JIT compiler may be configured to emit object code for the write and the associated write barrier—e.g., instructions to load one or more control table entries 151 and to determine how to proceed.

The additional operations may include such actions as updating card table entries, creating or modifying remembered set entries or train algorithm cars, copying objects from one region of the heap to another, writing addresses of modified objects or object fields to sequential store buffers, etc., based on the specific garbage collection policies and data structures 150 in use. It is noted that control table entries 150 and its entries 151 may not be modified by write barrier operations in some embodiments—that is, while control table entries may be used to determine the specific write barrier functions or operations to be performed, the control table may itself not be written to within a write barrier function. If the identified write barrier is a null barrier, or after the additional operations are performed, the mutator 110 may proceed to its next operation. In an embodiment where a garbage collection cycle is triggered by the mutator's write operation (e.g., if the write results in the updated fraction of heap 140 reaching a specified threshold), the garbage collector may be configured to initiate its operations after the write barrier operations are completed (e.g., after the operations corresponding to block 321 of FIG. 3). For example, in one implementation utilizing remembered sets, garbage collection may be triggered if the write barrier and/or concurrent refinement of remembered sets produces a region of heap 140 whose remembered set includes more than a specified number of entries. It is noted that write operations and their associated write barrier actions may be performed together as a logically indivisible operation in some embodiments—e.g., if the write is performed, its associated barrier action or actions have to be performed, even if the write results in a period of suspension of the mutator due to triggered garbage collection activity. That is, in embodiments where such mutator suspensions are triggered by a write, a period of suspension may not intervene between a write and its associated barrier actions.

Figure 4:
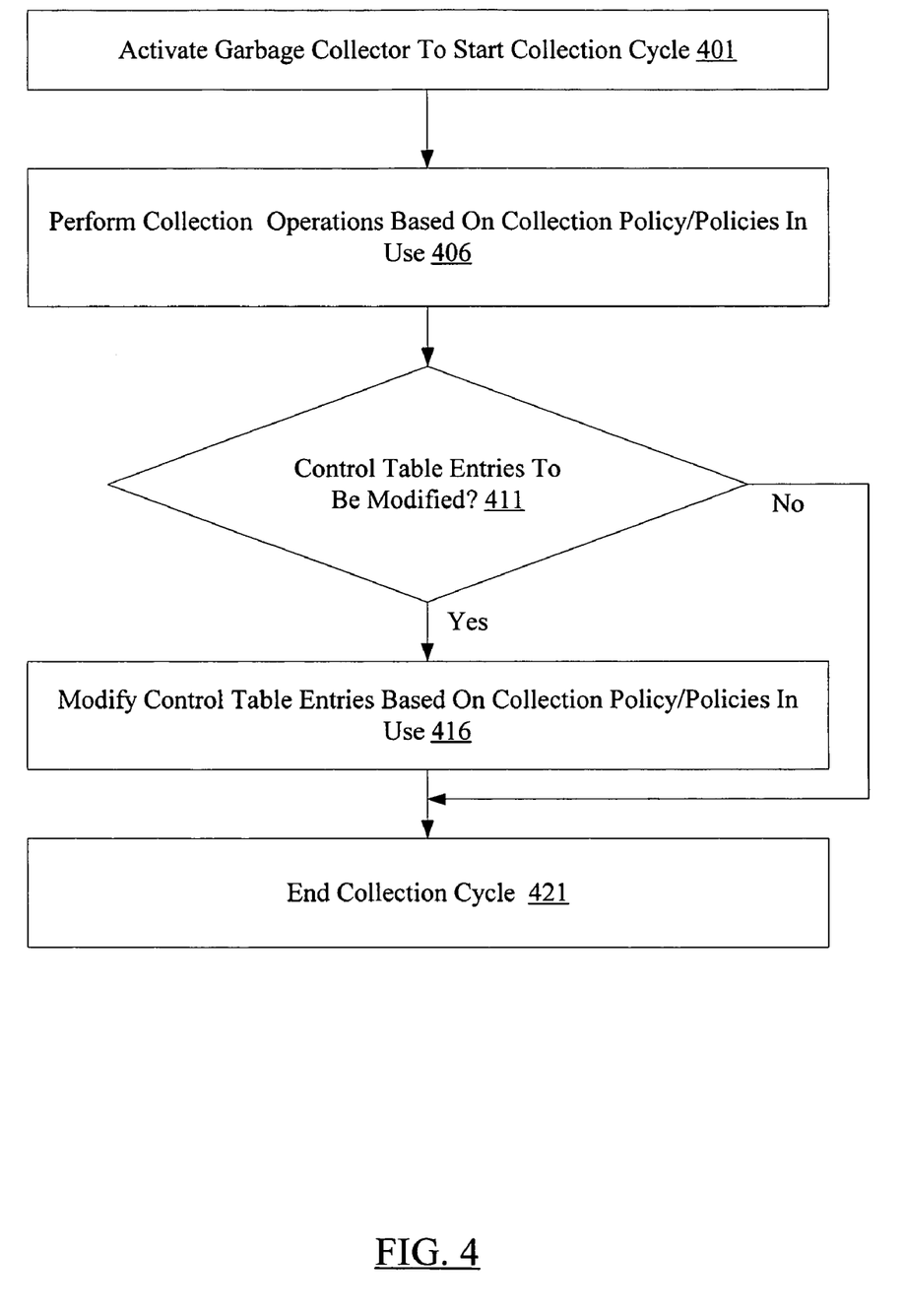
FIG. 4 is a flow diagram illustrating aspects of the operation of a garbage collector according to one embodiment.

FIG. 4 is a flow diagram illustrating aspects of the operation of a garbage collector 120 during one collection cycle according to one embodiment. A garbage collector 120 may be activated to perform a garbage collection cycle (block 401) as a result of a detection of a triggering condition in some embodiments (e.g., when no more free memory is available in heap 140 for allocation of new objects, or after the elapse of a specified time interval). After the garbage collector 120 is activated (block 401), it may perform collection operations, e.g., to find and reclaim unreachable objects in heap 140, based on the specific collection policies in use (block 406). As noted previously, any of a number of auxiliary data structures 150 may be used by garbage collector 120 to collect unreachable objects, such as card table entries, remembered set structures, modified object address lists, and the like. During collection operations, the garbage collector 120 may determine that one or more entries 151 of control table 150 should be modified—for example, as a result of a completion of a phase of collection on a particular heap area 141, or of object relocations or copies, etc. If such control table entries are identified (as detected in decision block 411), garbage collector 120 may be configured to perform the needed modifications (e.g., changes to encodings 152) in accordance with the collection policies in use (block 416) before the current collection cycle ends (block 421). In some embodiments, where for example an incremental garbage collector or a multi-phase garbage collector is used, the modifications to entries 151 may be based on the collection policy expected to be used for the corresponding heap regions 141 during the next collection interval or the next phase of collection, instead of, or in addition to, being based on the collection policy in use during the current collection interval or phase.

In one embodiment, garbage collector 120 may comprise multiple threads of execution, where more than one thread may concurrently operate on control table 150. A first thread of garbage collector 120 may be configured to examine a first set of control table entries 151 and perform a first set of operations on the heap 140 in accordance with the contents of the first set of control table entries in such an embodiment. At least partly concurrently with the first thread, a second thread of garbage collector 120 may be configured to perform a second set of operations, e.g., on a different region 141 of the heap and/or on related data structures 150, based on contents of a second set of table entries 151. For example, in a garbage collector employing a variant of the train algorithm, a first thread may be configured to perform collection on one heap region 141, while a second thread concurrently performs refinement of remembered set information (e.g., to increase the precision of the remembered set information) for another heap region. Either one or multiple threads of the garbage collector may also be configured to modify one or more control table entries in such embodiments.

The modifications to control table 150 may be performed after the collection operations, as depicted in FIG. 4, prior to the collection operations, or concurrently with one or more collection operations in various embodiments. It is noted that unlike some of the data structures 150 that may be modified during write barrier operations (which may be performed for a large number of write operations during mutator operation), updates to control table 150 may be performed fairly infrequently. For example, the number of modifications of a control table entry 151 may be roughly proportional to the number of garbage collection cycles during a given period (e.g., from several times a second for some incremental collectors to once every few minutes for some single-heap batch collectors), while the number of modifications of card table entries may be roughly proportional to the number of write operations in mutator code (e.g., potentially hundreds of thousands of times a second) in some embodiments. In addition to modifying control table 150 as needed, garbage collector 120 may be configured to modify the data structures 150 that are written to by write barriers as needed (e.g., garbage collector 120 may reset a "dirty" flag in a card table entry during the collection operations corresponding to block 406 of FIG. 4) in some embodiments. In contrast, in some embodiments, mutator 110 may not be configured to modify control table entries. Thus, modifications to control table 150 may differ from modifications to data structures 150 modifiable by write barrier functions both in frequency of occurrence and in the source (e.g., garbage collector code vs. mutator code) where the modifications originate.

Figure 5:
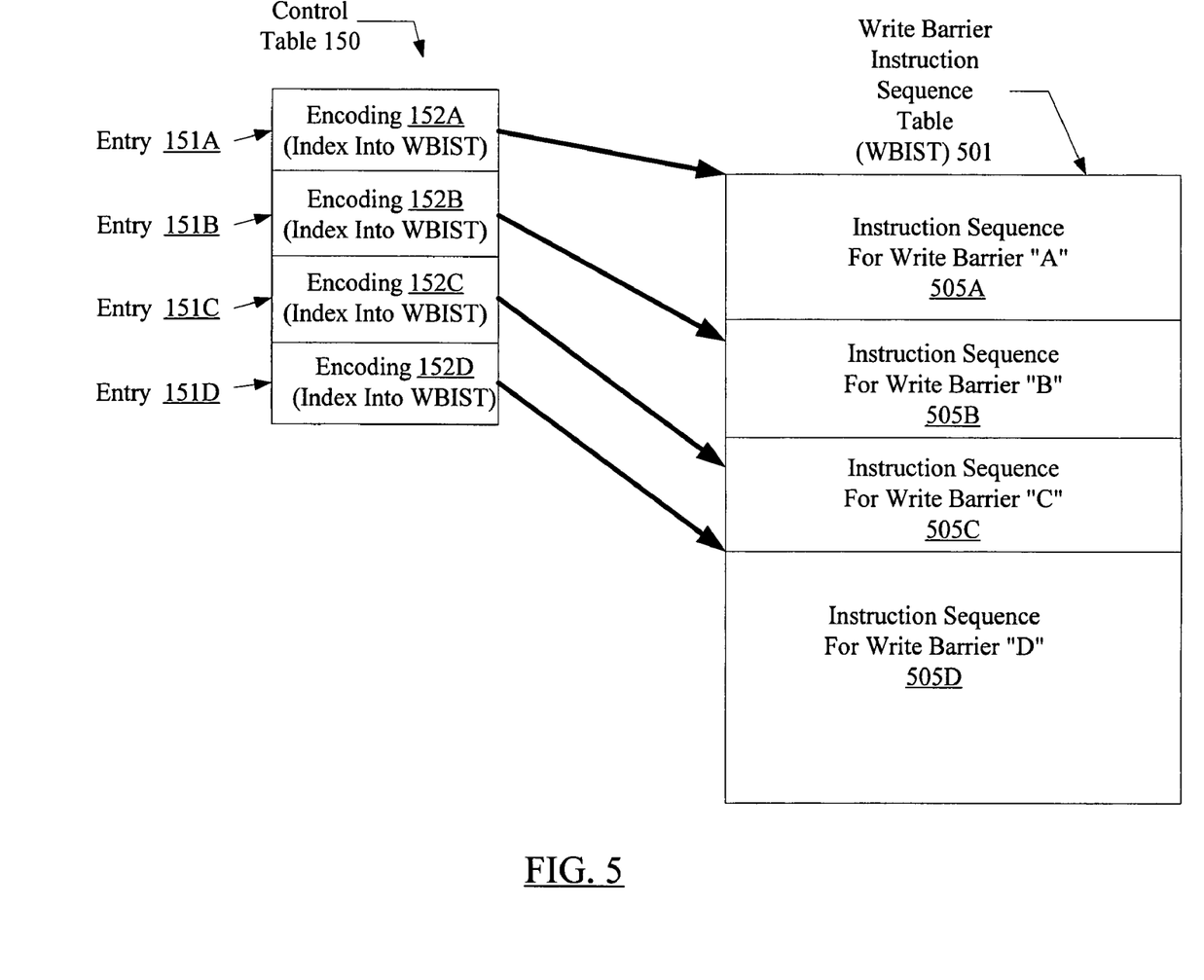
FIG. 5 is a block diagram illustrating an embodiment where encodings in control table entries may serve as indexes into a table of instruction sequences corresponding to different write barrier functions.

In one embodiment, encodings 152 in control table entries 151 may serve as indexes into a table of instruction sequences corresponding to different write barrier functions, as illustrated in FIG. 5. In such an embodiment, garbage collector 120 may maintain a write barrier instruction sequence table (WBIST) 501 containing the specific instructions to be executed for a number of barrier actions 505, and encodings 152 may be implemented as integer values that point to the offsets within WBIST 501 where the corresponding write barrier instruction sequence is located. For example, instruction sequence 505A for write barrier "A" may be executed for writes to a heap region 141 corresponding to control table entry 151A, instruction sequence 505B for write barrier "B" may be executed for writes to a heap region corresponding to control table 151B, etc. In some embodiments, the encodings 152 may point to entries within a table containing names of or pointers to functions, rather than to the instruction sequences as shown in FIG. 5. It is noted that the number of entries within control table 150 may differ from the number of write barriers whose instruction sequences, names or pointers are maintained by garbage collector 120 in some embodiments. For example, multiple control table entries 151 may identify the same write barrier function in some embodiments, where more than one heap region 141 may require the same write barrier function to be performed during a particular period of mutator activity. In other embodiments, the number of different write barriers from which one may be selected for a particular write operation may exceed the number of control table entries, for example in embodiments where a multiphase garbage collector 120 is employed, and where each phase may have its own set of barrier actions. In such embodiments, instruction sequences for all the possible write barrier functions may be pre-generated and maintained in WBIST 501, and garbage collector 120 may modify the encodings 152 to point to the appropriate write barrier function for each heap region 141 for the current phase and/or the next phase as needed. In some embodiments where a table such as WBIST 501 is employed, a null barrier may be included within the WBIST as a special instruction sequence of zero length.

Figure 6:
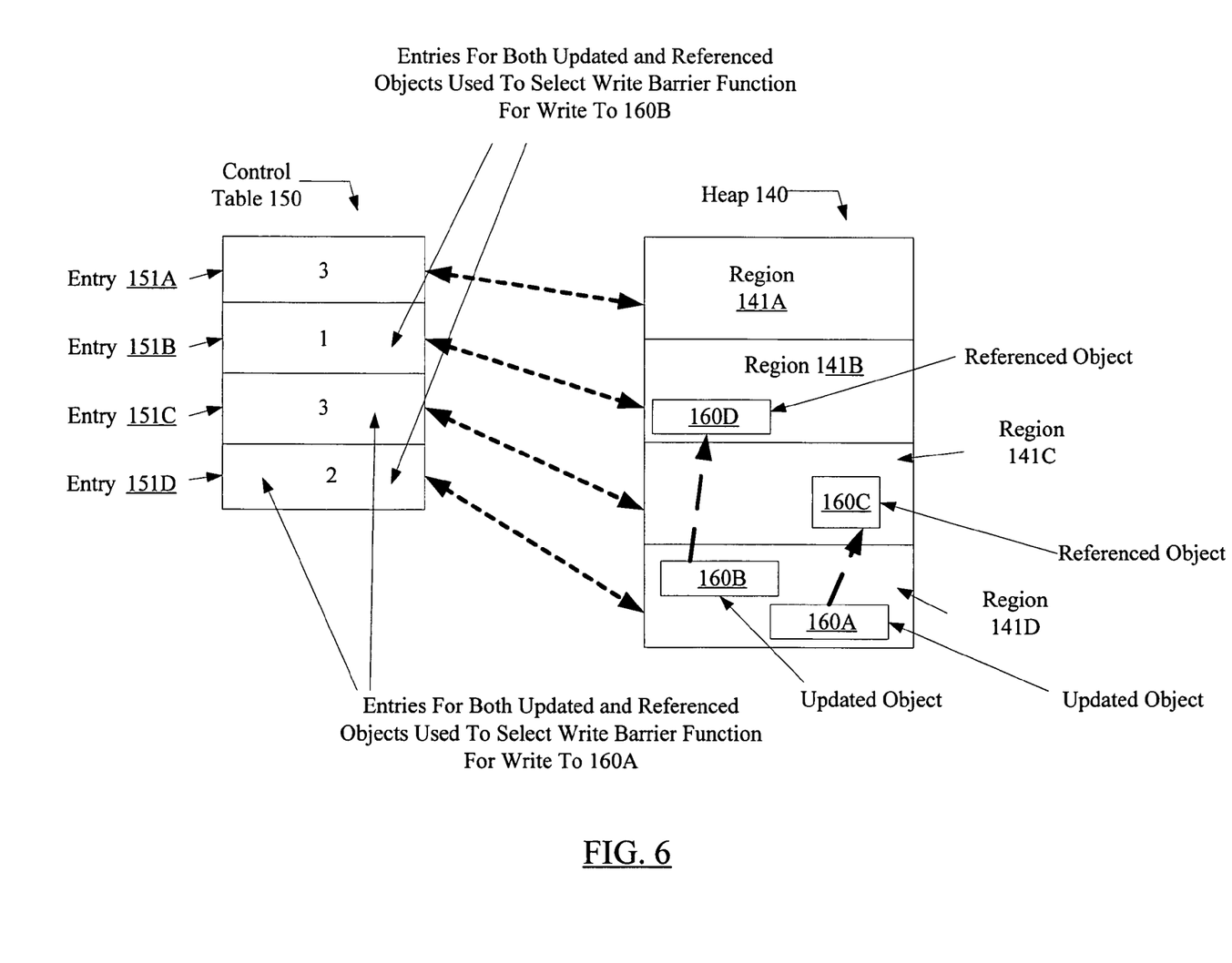
FIG. 6 is a block diagram illustrating an embodiment where the write barrier function to be performed for a write operation may depend on the heap address of more than one object.

FIG. 6 is a block diagram illustrating an embodiment where the write barrier function to be performed for a write operation may depend on the heap address of more than one object. In certain garbage collection algorithms, the information to be recorded for a mutator write may depend not only on the heap region within which the updated object lies, but also upon the region within which the object referenced in the write operation lies. For example, a particular incremental garbage collector 120 may be configured to divide the heap into a hierarchy of collection sets during a collection interval, and associate a collection set level with each level of the hierarchy. The collection set levels may indicate a sequence in which the collector 120 intends to perform collection operations during the interval—for example, the collector may perform collection for the different collection sets in ascending order of collection set level. The garbage collector 120 may be configured to attempt to complete a collection interval within a specified amount of time (for example, to prevent long mutator pauses or suspensions), and may attempt to collect unreachable objects from as many collection sets as possible during the time allotted for the collection interval, starting with the lowest level collection set. Such a garbage collector 120 may be configured to further optimize collection by avoiding some barrier operations for write operations based on the relative collection set levels of the updated object and the object referred to by the update. For example, in certain train-algorithm based collectors, some write barrier operations (e.g., related to remembered set maintenance and updates) may be avoided for a write whose updated object lies in a region of the heap that is going to collected no later than the region containing the referred-to object (i.e., where the collection set level associated with the updated object is less than or equal to the collection set level of the referred-to object). In the embodiment shown in FIG. 6, the encoding 152 may represent the collection set level for the corresponding region 141. Thus, the collection set level for region 141D ("2") is less than or equal to the collection set level for region 141C ("3"), but greater than the collection set level for region 141B ("1"). Mutator 110 may update two objects 160A and 160B within region 141D to reference respective objects 160C (in region 141C) and 160D (in region 141B).

Since the collection set level for region 141B is less than that of region 141D, so that region 141B is to be collected earlier than region 141D, a write barrier function that saves information about the update to 160B for later use by the garbage collector 120 may have to be executed. However, since region 141D's collection set level is lower than that of region 141C (so that region 141D is to be collected prior to region 141C), part or all of the write barrier may be avoided for the update to object 160A. If a variant of the train algorithm employing remembered sets is used by garbage collector 120 in the embodiment of FIG. 6, for example, barrier operations related to remembered set updates for the write to object 160A may be avoided because an operation to evacuate object 160A during collection of region 141D may require the remembered set updates to be performed anyway, whether the remembered set updates were earlier performed in a write barrier or not. Other collection policies, which may not implement collection set levels and/or train algorithms as described above, may also require a selection of write barrier functions for a particular write operation based on locations of both the updated object and the referenced object in some embodiments.

Figure 7:
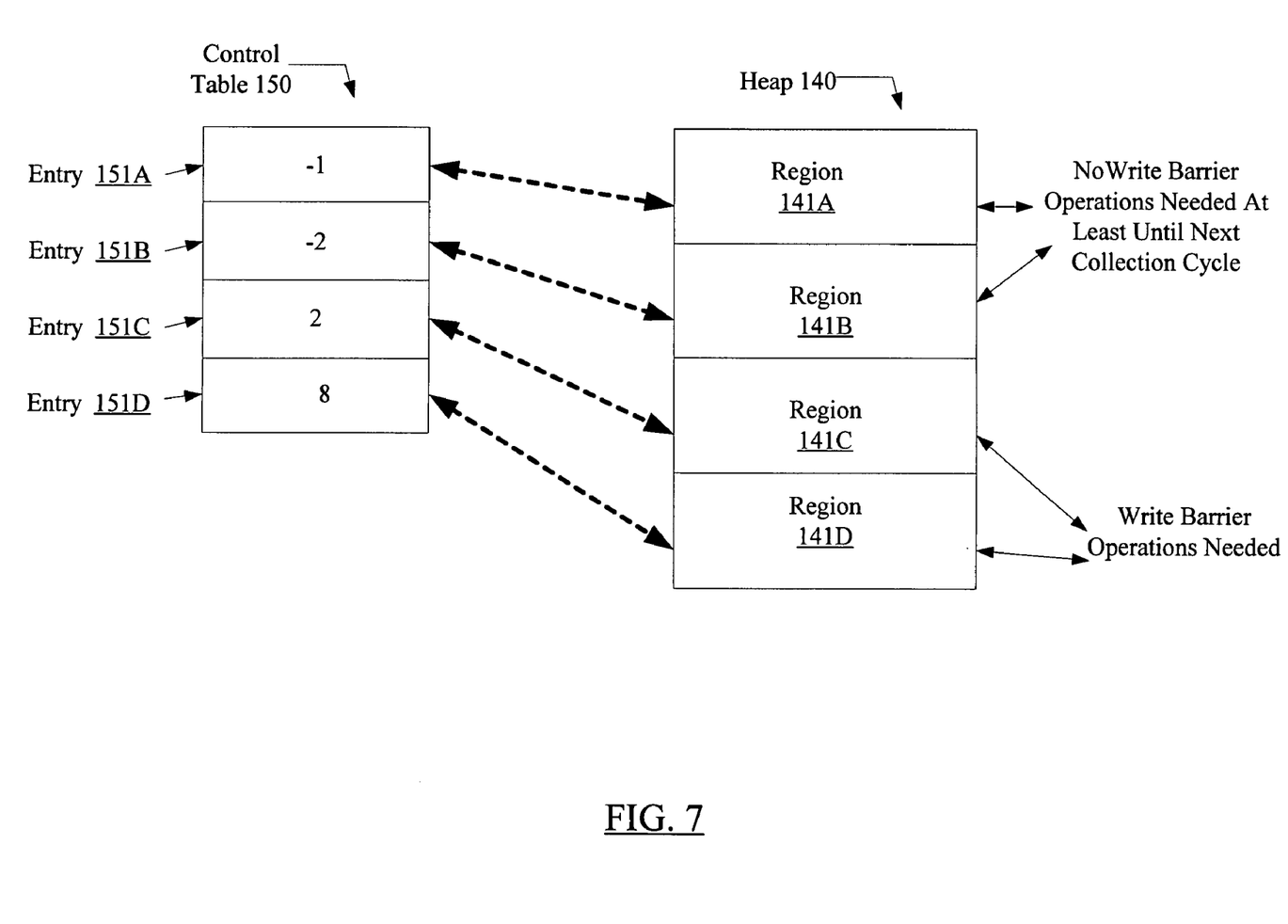
FIG. 7 is a block diagram illustrating an embodiment where a range of numerical values for control table entry encodings may be used to indicate that a particular write barrier is to be implemented for a corresponding heap region.

FIG. 7 is a block diagram illustrating an embodiment where a range of numerical values for encodings 152 may be used to indicate that a particular write barrier is to be implemented for the corresponding heap region 141. In the illustrated embodiment, encodings 152 may include both negative and non-negative integer values. A negative encoding for a particular control table entry may indicate, for example, that a null barrier is to be employed for the corresponding heap region 141, while a non-negative encoding may be used to indicate that a non-null barrier is to be employed. In some implementations, a single negative encoding value (e.g., "−1") may be used for all regions where null barriers are to be employed, while in other implementations, a range of negative values may be used. In embodiments where any negative value of encoding 152 indicates that a null barrier is to be used, different negative values may also be used to indicate additional differences in the treatment of the corresponding heap regions 141 during garbage collection, such as to indicate a sequence in which the regions are to be collected and/or different sets of operations to be performed on data structures 150 for the corresponding heap regions.

In various embodiments, processors 101 may be implemented using any desired architecture or chip set, such as the SPARC™ architecture from Sun Microsystems or the x86-compatible architectures from Intel Corporation, Advanced Micro Devices, etc. Program instructions that may be executable to implement the functionality of memory manager 115 and/or mutator 110 may be partly or fully resident within a memory 102 at a given point in time, and may also be stored on a storage device (not shown in FIG. 1). In various embodiments, mutator 110 may be any type of individual or standalone application (e.g., a database application or a scientific simulation application), an instance or component of a distributed application, an application server configured to support a collection of deployed applications including J2EE™ (Java 2 Enterprise Edition) applications, etc. Memory 102 may be implemented using any appropriate medium such as any of various types of RAM (e.g., DRAM, SDRAM, RDRAM, SRAM, etc.). In addition to processors 101 and memory 102, system 100 may also include one or more I/O interfaces providing access to storage devices, one or more network interfaces providing access to a network and the like. Any of a variety of storage devices may be used to store the instructions as well as data for mutator 110 in different embodiments, include any desired type of persistent and/or volatile storage devices, such as individual disks, disk arrays, optical devices such as CD-ROMs, CD-RW drives, DVD-ROMs, DVD-RW drives, flash memory devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   maintaining a control table including a plurality of entries, wherein each entry includes an encoding indicative of a write barrier function associated with a corresponding region of a heap;
   in response to a detection of a write operation directed at the heap in a code sequence of a mutator,
      selecting a particular entry of the control table that corresponds to a heap address identified in the write operation;
      identifying, based on the encoding included in the particular entry, a write barrier function to be performed for the write operation from among a plurality of write barrier functions.

2. The method as recited in claim 1, wherein the region of the heap corresponding to an entry of the control table includes a plurality of independently allocated objects.

3. The method as recited in claim 1, further comprising:
   during a collection cycle of a garbage collector, determining whether an entry of the control table is to be modified in accordance with a collection policy in use during the collection cycle; and
   if a result of the determination is positive, modifying the entry in accordance with the collection policy.

4. The method as recited in claim 3, wherein the garbage collector is configured to use two or more collection policies including a first collection policy associated with a first write barrier function and a second collection policy associated with a second write barrier function, further comprising:
   modifying a first entry of the control table associated with a first region of the heap to include a first encoding indicative of the first write barrier function; and
   modifying a second entry of the control table associated with a second region of the heap to include a second encoding indicative of the second write barrier function.

5. The method as recited in claim 1, wherein the particular entry corresponds to the heap address of a first object being modified in the write operation, further comprising:
   selecting a second entry of the control table that corresponds to a heap address of a second object being referenced in the write operation; and
   identifying the write barrier function based on the encodings of the particular entry and the second entry.

6. The method as recited in claim 1, wherein the write operation is directed to a first heap address, further comprising:
   detecting that a second write operation in the code sequence of the mutator is directed to a second heap address that also corresponds to the particular entry; and
   identifying the write barrier function to be performed for the second write operation without reaccessing the control table.

7. The method as recited in claim 1, wherein a first write barrier function of the plurality of write barrier functions is a null barrier.

8. The method as recited in claim 1, wherein the encodings in the control table include numerical values, and wherein, if the encoding in the particular entry is within a specified range of numerical values, the write barrier identified for the write operation is the null barrier.

9. The method as recited in claim 1, further comprising:
   allocating a new region of memory to the heap; and
   including an encoding of a default write barrier function in an entry of the control table corresponding to the new region.

10. The method as recited in claim 1, further comprising:
    inserting one or more instructions corresponding to the write barrier function into the mutator code sequence.

11. The method as described in claim 10, wherein the one or more instructions are inserted by a just-in-time (JIT) compiler.

12. The method as recited in claim 1, wherein the number of entries to be included in the control table for a particular heap size is a configurable parameter provided as an input to a garbage collector.

13. The method as recited in claim 1, further comprising:
    a first thread of a multi-threaded garbage collector performing a first set of operations on a first region of the heap in accordance with a first encoding included in the particular entry of the control table; and
    a second thread of the multi-threaded garbage collector performing a second set of operations on a second region of the heap in accordance with a second encoding included in a second entry of the control table, wherein the second set of operations are performed at least partly concurrently with the first set of operation.

14. A system, comprising:
    a processor; and
    a memory coupled to the processor and configured to store program instructions executable by the processor to:
       maintain a control table including a plurality of entries, wherein each entry includes an encoding indicative of a write barrier function associated with a corresponding region of a heap;

in response to a detection of a write operation directed at the heap in a code sequence of a mutator,     select a particular entry of the control table that corresponds to a heap address identified in the write operation;

identify, based on the encoding included in the particular entry, a write barrier function to be performed for the write operation from among a plurality of write barrier functions.

15. The system as recited in claim 14, wherein the instructions are further executable by the processor to:

during a collection cycle of a garbage collector, determine whether an entry of the control table is to be modified in accordance with a collection policy in use during the collection cycle; and if a result of the determination is positive, modify the entry in accordance with the collection policy.

16. The system as recited in claim 15, wherein the garbage collector is configured to use two or more collection policies including a first collection policy associated with a first write barrier function and a second collection policy associated with a second write barrier function, wherein the instructions are further executable by the processor to:

modify a first entry of the control table associated with a first region of the heap to include a first encoding indicative of the first write barrier function; and modify a second entry of the control table associated with a second region of the heap to include a second encoding indicative of the second write barrier function.

17. The system as recited in claim 14, wherein the particular entry corresponds to the heap address of a first object being modified in the write operation, wherein the instructions are further executable by the processor to:

select a second entry of the control table that corresponds to a heap address of a second object being referenced in the write operation; and identify the write barrier function based on the encodings of the particular entry and the second entry.

18. A computer readable medium comprising program instructions, wherein the instructions are computer executable to:

maintain a control table including a plurality of entries, wherein each entry includes an encoding indicative of a write barrier function associated with a corresponding region of a heap;

upon detecting a write operation directed at the heap in a code sequence of a mutator,     select a particular entry of the control table that corresponds to a heap address identified in the write operation;

identify, based on the encoding included in the particular entry, a write barrier function to be performed for the write operation from among a plurality of write barrier functions.

19. The computer readable medium as recited in claim 18, wherein the instructions are further computer executable to:

during a collection cycle of a garbage collector, determine whether an entry of the control table is to be modified in accordance with a collection policy in use during the collection cycle; and if a result of the determination is positive, modify the entry in accordance with the collection policy.

20. The computer readable medium as recited in claim 19, wherein the garbage collector is configured to use two or more collection policies including a first collection policy associated with a first write barrier function and a second collection policy associated with a second write barrier function, wherein the instructions are further computer executable to:

modify a first entry of the control table associated with a first region of the heap to include a first encoding indicative of the first write barrier function; and modify a second entry of the control table associated with a second region of the heap to include a second encoding indicative of the second write barrier function.

21. The computer readable medium as recited in claim 18, wherein the particular entry corresponds to the heap address of a first object being modified in the write operation, wherein the instructions are further computer executable to:

select a second entry of the control table that corresponds to a heap address of a second object being referenced in the write operation; and identify the write barrier function based on the encodings of the particular entry and the second entry.

22. A system, comprising:

a garbage collector configured to maintain a control table including a plurality of entries, wherein each entry includes an encoding indicative of a write barrier function associated with a corresponding region of a heap; and an object code modifier configured to, in response to a detection of a write operation directed at the heap in a code sequence of a mutator,     select a particular entry of the control table that corresponds to a heap address identified in the write operation;

make a determination, based on the encoding included in the particular entry, whether a particular write barrier function from among a plurality of write barrier functions is to be performed for the write operation; and     if the result of the determination is positive, insert one or more instructions corresponding to the particular write barrier function into the code sequence of the mutator.

\* \* \* \* \*